Jan. 18, 1938.　　　　C. FREDDINO　　　　2,105,689
COUPLING DEVICE FOR FLEXIBLE MEMBERS
Filed Dec. 31, 1936
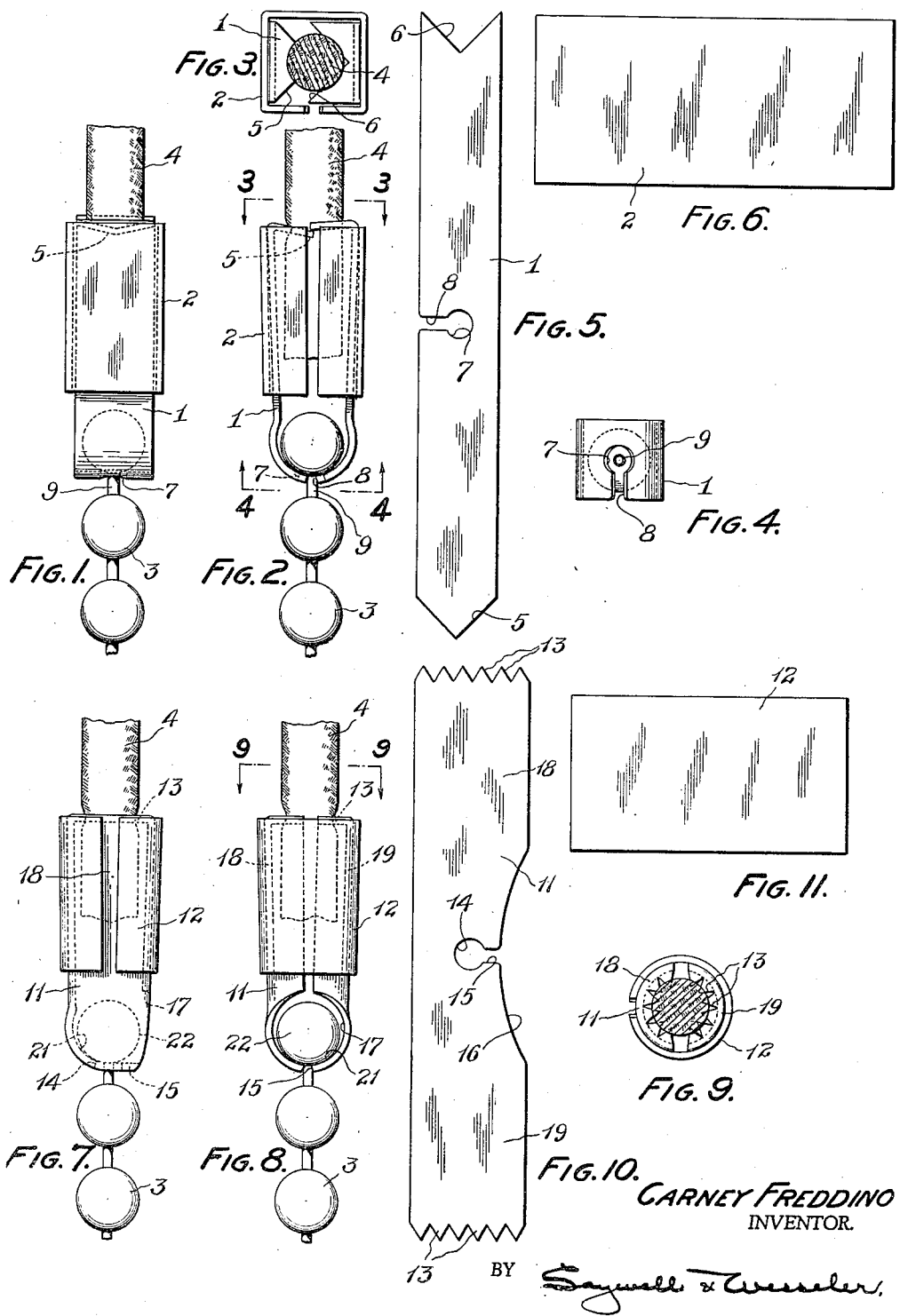
CARNEY FREDDINO
INVENTOR.
BY Saywell & Wheeler
ATTORNEYS Patented Jan. 18, 1938

2,105,689

UNITED STATES PATENT OFFICE 2,105,689

COUPLING DEVICE FOR FLEXIBLE MEMBERS

Carney Freddino, Bridgeport, Conn., assignor to The Bridgeport Chain & Manufacturing Company, Bridgeport, Conn., a corporation of Connecticut Application December 31, 1936, Serial No. 118,560

4 Claims. (Cl. 24—116)

This invention, as indicated, relates to a coupling device for flexible members. More particularly, it comprises a device especially adapted to unite the end of a bead chain with the end of a cord, such structure being particularly applicable to devices for controlling shades and screens of various types.

The principal object of the present invention is to provide a structure adapted for high speed production at low cost, and thoroughly dependable in service.

Another object of the invention is to provide a coupling device adapted to be formed from a strip of sheet metal with the cord-engaging elements formed on the extreme end members thereof and with a bead chain engaging portion formed centrally thereof and with an operating member formed as an encircling band from a plain piece of sheet metal.

Another object of the invention is to provide a coupling device for a bead chain cord which will withstand a high degree of severe usage and which will grip the cord firmly without weakening the cord structure at the point of engagement.

Another object of the invention is to provide a coupling member which is easily manufactured and which at the same time is most effective in operation, as well as attractive in appearance.

Other and further objects of the invention will appear in the course of the following description.

To the accomplishment of the foregoing and related ends, said invention, then, consists of the means hereinafter fully described and particularly pointed out in the claims, the annexed drawing and the following description setting forth in detail certain structures embodying the invention, such disclosed means constituting, however, but several of various forms in which the principle of the invention may be used.

In said annexed drawing:

Figure 1 is a front elevation showing a coupling member joining a bead chain section and a cord section and embodying the principles of the invention;

Figure 2 is a side elevation of the structure shown in Figure 1;

Figure 3 is an end view of the cord portion of the structure shown in Figures 1 and 2, taken along the line 3—3 shown in Figure 2, looking in the direction of the arrows;

Figure 4 is an end view of the bead chain portion of the structure shown in Figures 1 and 2, taken along the line 4—4 shown in Figure 2, looking in the direction of the arrows;

Figure 5 is a plan view of the blank from which the body portion of the coupling is formed;

Figure 6 is a plan view of the blank from which the collar portion of the structure is formed;

Figure 7 is a front elevation of a modified form of structure embodying the principles of the invention;

Figure 8 is a side elevation of the structure shown in Figure 7, as seen from the right hand side of Figure 7;

Figure 9 is an end view of the cord portion of the structure shown in Figures 7 and 8, taken along the line 9—9 shown in Figure 8, looking in the direction of the arrows;

Figure 10 is a plan view of the blank from which the body portion of the coupling shown in Figures 7 and 8 is formed; and Figure 11 is a plan view of the blank from which the collar portion of the structure shown in Figures 7 and 8 is formed.

As shown in Figures 1 to 6 of the drawing, the coupling device comprises a body portion 1 and a sliding collar 2, each formed from a strip of sheet metal and adapted, when bent to the shape illustrated, to serve as a means for uniting a portion of a bead chain 3 with a cord or like flexible member 4. The body portion 1 is preferably formed of a strip of metal punched or cut so as to provide a V-shaped point or projection 5 at one end, and a V-shaped notch or depression 6 at the opposite end. The pointed end portion of one device will be formed by a single cutting operation which will provide the notched end portion of the adjacent device, so that no waste of metal will occur.

Centrally of the blank an aperture 7 is provided connected with one side of the blank by means of a narrow slot 8 providing a throat or passageway through which the connecting bar element 9 of a bead chain may be engaged. The blank, after being cut or stamped out in the manner indicated, is bent to substantially the shape shown in Figure 2, whereby it is provided with a bead chain engaging aperture at one end and with the cord engaging clamping elements at the opposite end.

The collar or locking element of the device is bent so as to form a substantially square member as seen in cross section, and is slidingly engaged over the side portions of the body member 1, preferably after the end of the bead chain has been engaged in the aperture 7 of the body member. The side portions of the body member 1, when engaged with the cord, will normally be spread so as to present a diverging angle toward the free end portions. As the sliding collar is moved upwardly in a direction toward said free ends, the clamping jaws are forced into firm engagement with the cord, compressing and deforming the same so as to provide a firm clamping engagement therewith.

It will be noted by reference to Figure 3, that one large tooth 5 is provided at one end of the body portion of the device and cooperates with the V-shaped notch 6 formed in the opposite end portion, and that the sides of the body portion are substantially flat members with open spaces intermediate the same within which the end portion of the cord is received, the collar 2 coacting with the sides of the body to provide a housing for such end portion of the cord. Thus, by reducing the structural elements to a minimum, and using merely simple bending operations to shape the flat parts in the manner described, a coupling member is provided without the necessity of using special forming and shaping dies. If desired, a much heavier metal can be used for a coupling of this character than where special shaping and drawing operations are involved. The character of the metal used, however, is controlled to a large extent by the use to which the coupling is to be put, and a lighter metal may be used where only light strains are to be placed upon the coupling.

In the modified form of construction shown in Figures 7 to 11 inclusive, the body portion 11 of the device may be formed of a blank similar to that shown in Figure 5, although somewhat wider as illustrated in Figure 10. The sliding collar 12 will be somewhat less in circumferential extent than the sliding collar 2, inasmuch as the body member is shaped to substantially cylindrical form over the greater portion of its extent. In place of having a single tooth and a complementary recess in the blank for the body portion of the device, the body portion in the modified form is provided with a series of small clamping teeth 13 at each end. The central portion of the device is provided with an aperture 14 having a slot 15 through which the connecting bar element 9 of a bead chain 3 may be engaged. In view of the greater width of the blank, the central marginal portion of the blank adjacent the slot 15 is cut away to provide a shallow recess 16 which, besides providing an enlarged bead receiving opening 17 adjacent the shorter slot 15 for the reception of the bead chain bar element 9, also permits the respective end portions 18, 19 of the blank to be bent to substantially semi-cylindrical form, as shown more particularly in Figure 9. When so bent, the teeth 13 will be brought somewhat closer together and the teeth of the respective end portions will lie in substantially the same plane. Thus, with the cord 4 intermediate the same, such teeth will provide substantially complete circumferential engagement with such cord and distribute the strains transmitted by the coupling member over an extended circumferential area of the cord and prevent tearing action by the teeth.

The body portion of the device opposite the large bead receiving opening 17 is shaped to provide a rounded seat 21 against which the terminal bead 22 of the chain may engage.

The locking collar 12 is bent to substantially cylindrical form with preferably a slight taper in the direction of the free ends of the body portion, and is engaged over the body portion of the device after the terminal bead 22 of the bead chain has been placed in position. The teeth 13 at the free ends of the structure are then engaged over the end portion of a cord 4 and the locking collar is drawn towards the free end portion of the device to force the teeth into the cord.

Each of the forms of construction above described is adapted for quantity production and will result in an article having a high degree of strength and dependability. As has been stated, the first form of construction reduces the coupling to a structure of the utmost simplicity. This is combined with a very high degree of serviceability, inasmuch as has been stated the parts may be formed of somewhat heavy gage material and still be operable without undue effort.

Other modes of applying the principle of my invention may be employed instead of those explained, change being made as regards the structure herein disclosed, provided the means stated by any of the following claims or the equivalent of such stated means be employed.

I therefore particularly point out and distinctly claim as my invention:

1. An article of the character described having in combination, a body member and a sliding collar, each formed of a flat strip of sheet metal, said body member being provided centrally with a keyhole slot open at one side of the strip, said body member being a U-shaped strip and provided with cord-engaging elements formed at the free ends of said strip and bent inwardly and extending toward each other, and said collar being in the form of a hollow four-sided prism embracing the ends of the body member to operate in sliding relation thereto to effect clamping engagement of said cord-engaging ends.

2. An article of the character described having in combination, a body member formed of a strip of sheet metal of substantially uniform width throughout and provided centrally with a keyhole slot opening at one lateral margin to receive the terminal link of a bead chain and having substantially parallel side members, the extreme ends of said side members being bent inwardly toward each other and formed with cord engaging elements, and a sliding collar formed of a flat strip of sheet metal of substantially uniform width throughout and engaged over said side members of the body member to bring said ends into clamping engagement with said cord.

3. An article of the character described having in combination, a body member formed of a strip of sheet metal of substantially uniform width throughout and provided centrally with a keyhole slot opening at one lateral margin to receive the terminal link of a bead chain and having substantially parallel side member, the extreme ends of said side members being bent inwardly toward each other and formed with at least one complementary tooth and recess for engaging a cord, and a sliding collar formed of a flat strip of sheet metal of substantially uniform width throughout and engaged over said side members of the body member to bring said ends into clamping engagement with said cord.

4. An article of the character described having in combination, a body member formed of a strip of sheet metal of susbtantially uniform width throughout and provided centrally with a keyhole slot opening at one lateral margin to receive the terminal link of a bead chain and having substantially parallel side members and a substantially square cross sectional outline for said body member, the extreme ends of said side members being bent inwardly toward each other and formed with cord engaging elements, and a sliding collar formed of a flat strip of sheet metal of substantially uniform width throughout and of substantially square cross-sectional outline engaged over said side members of the body member to bring said ends into clamping engagement with said cord.

CARNEY FREDDINO.